United States Patent [19]

Travor

[11] Patent Number: 5,359,917

[45] Date of Patent: Nov. 1, 1994

[54] SIMPLIFIED REUSABLE SONOBUOY LAUNCHER

[75] Inventor: Bruce W. Travor, Holland, Pa.

[73] Assignee: The United States of America as represented by the Secretary of the Navy, Washington, D.C.

[21] Appl. No.: 102,023

[22] Filed: Jul. 28, 1993

[51] Int. Cl.⁵ .......................... B64D 1/04; F41F 5/00
[52] U.S. Cl. .................................. 89/1.51; 244/137.4
[58] Field of Search ........................ 89/1.51, 1.56; 244/137.4

[56] References Cited

U.S. PATENT DOCUMENTS

| | | | |
|---|---|---|---|
| 3,295,410 | 1/1967 | Edwards | 89/1.51 |
| 4,397,433 | 8/1983 | Guitaut et al. | 89/1.51 |
| 4,962,798 | 10/1990 | Ferraro et al. | 244/137.1 |
| 5,052,270 | 10/1991 | Travor et al. | 89/1.51 |
| 5,063,823 | 11/1991 | Marshall et al. | 89/1.51 |

*Primary Examiner*—David Brown
*Attorney, Agent, or Firm*—James V. Tura; James B. Bechtel; Susan E. Verona

[57] ABSTRACT

An improved, multi-store dispenser is described which uses a solenoid and spring combination to eject individual stores after an electrical pulse is sent from the transporting aircraft. As each store is loaded into the dispenser, the loading action forces a spring into a compressed mode and a latch is closed to prevent expulsion. An electric pulse trips a solenoid, which in turn causes the latch to release, thereby allowing the store to be ejected.

5 Claims, 4 Drawing Sheets

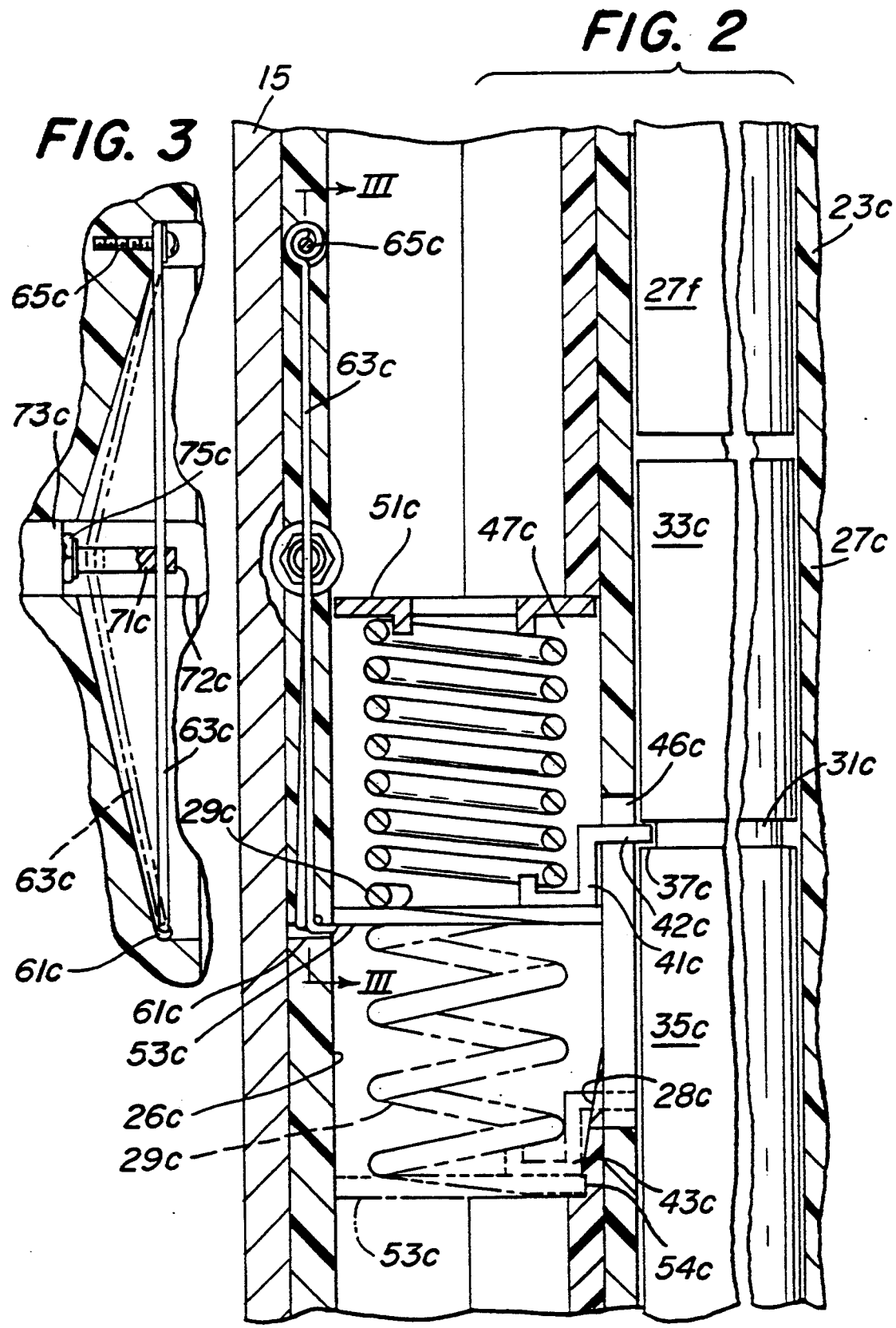

SIMPLIFIED REUSABLE SONOBUOY LAUNCHER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention discloses an electrically-actuated, multi-store dispenser wherein stored spring energy is released to launch a store, such as a sonobuoy. In many environments, a simplified, mechanically-operating sonobuoy launcher is more desirable than a sophisticated one. This is even more true when the launch container is of a style and size that has proven its reliability, vis-a-vis its interface with the transporting aircraft. In present times, though, it became apparent that, even though the size and style of the launch container remained the same, the size of the actual buoy has decreased. In an environment of reduced overhead and associated expenses, it became necessary to find ways to utilize the standard size launch containers with the smaller buoys. Additionally, it was very much desirable to use and reuse the containers, and to make the whole operation as simple as possible.

SUMMARY OF THE INVENTION

It is therefore an object of the present invention to provide from a standard-size launch container a multi-store launcher for launching, sequentially, a plurality of stores wherein said container is adaptable to presently existing transporting vehicles.

It is another object of the present invention to provide a multi-store launcher that is able to use electric pulses from the transporting vehicle to sequentially activate individual solenoids to cause a release of the individual buoys.

It is still another object of the present invention to provide said multi-store launcher without making significant alterations to the standard-size launch container.

These and other objects and many attendant advantages of the present invention are achieved by providing a standard size, tubular, launch container that has multiple chambers for holding stores, such as sonobuoys, adjacent to chambers for holding compression drive springs. As each buoy is loaded into its chamber, a notched section provides a ledge to catch the tip end of a drive lug. The drive lug is connected to a drive spring in the next chamber and as the buoy is forced up into the container, the lug compresses the drive spring back to a coiled position where it catches against a latch spring. An electrically-actuated solenoid, connected to the transporting aircraft's system, receives a pulse and moves the latch spring, thereby allowing the drive spring to uncoil and launch the buoy.

BRIEF DESCRIPTION OF THE DRAWINGS

FIG. 2 is an enlarged, cross-sectional view of one of the pairs of drive spring chamber and store chamber combinations;

FIG. 3 is a cross-sectional view of a release means taken along lines III—III of FIG. 2;

DETAILED DESCRIPTION OF THE PREFERRED EMBODIMENT

Figure 1:
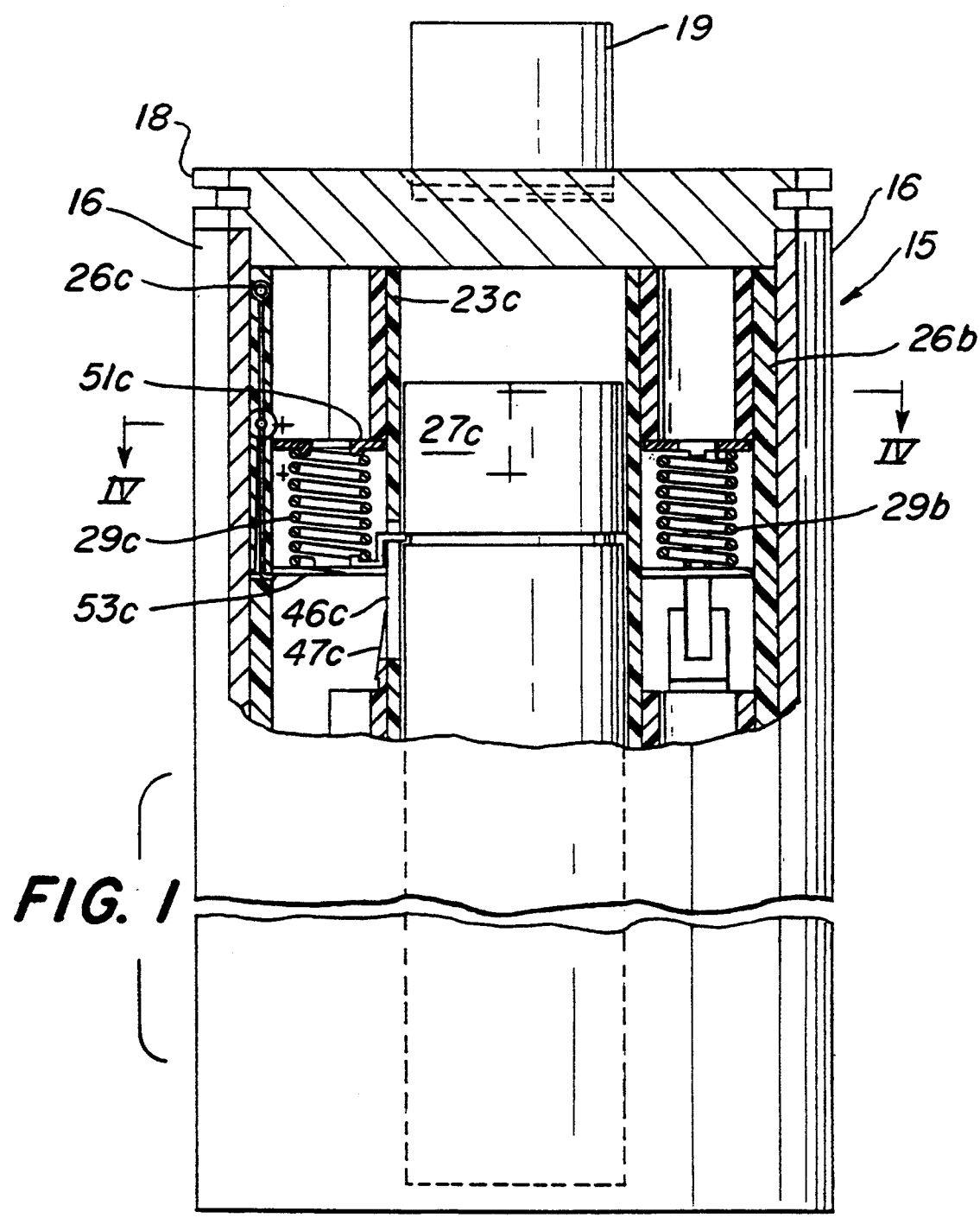
FIG. 1 is an elevation view, partially cut-away at the breech end, of a multi-store launch container.
Figure 4:
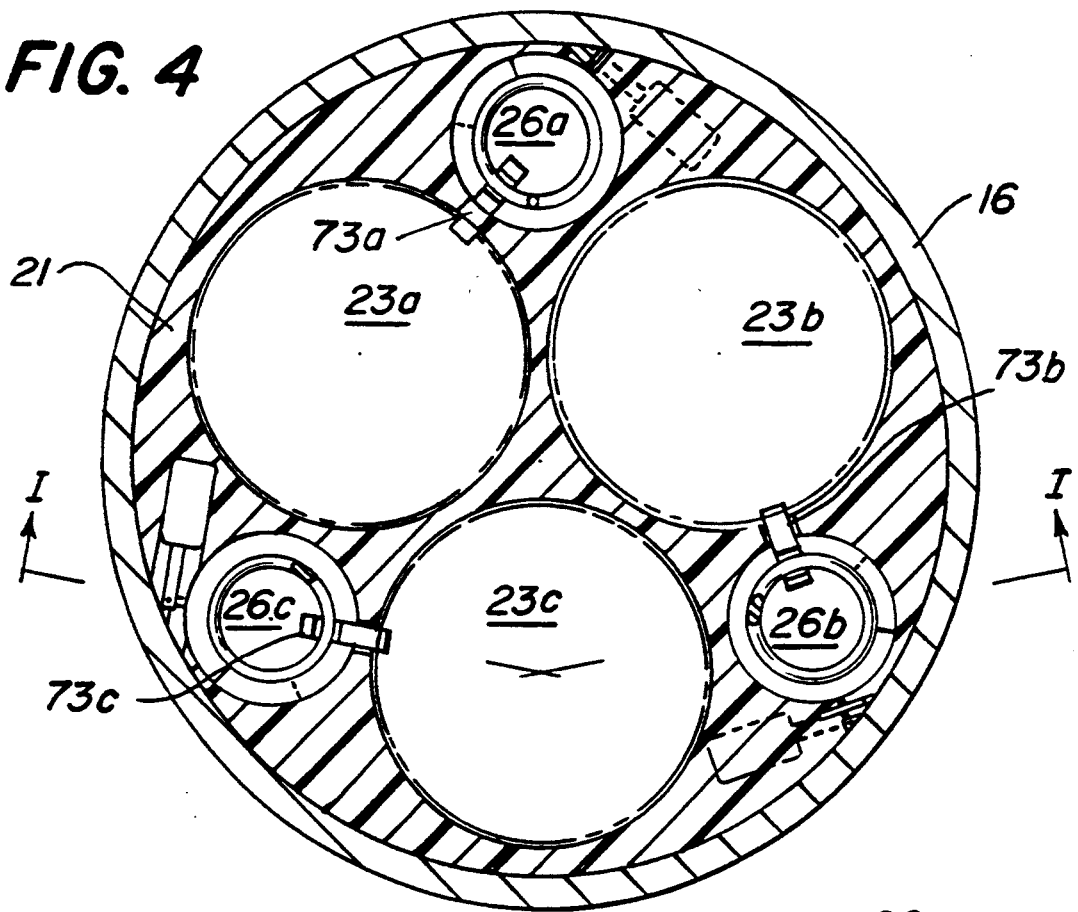
FIG. 4 is a cross-sectional view of the launch container taken along lines IV—IV of FIG. 1.

Referring now to the several drawings, wherein like numerals refer to like parts, there is shown in FIG. 1 an elevation view, partially cut-away at the breech end, of a multi-store launch container 15. Container 15 generally has a tubular shape and is suitable for being removably attached, as at flange 18, to a transporting vehicle, such as an aircraft. An electrical control module 19, for a purpose to be described, connects into the aircraft's electrical system and serves to transfer electrical pulses sent from the on-board control center. Container 15 can be made from any lightweight but durable material, such as aluminum or ABS plastic 16. As seen in FIG. 4, a cross-sectional view of the launcher taken along lines IV—IV of FIG. 1, there are a plurality of buoy chambers 23a, b, and c and a plurality of compression drive spring chambers 26a, b, and c located inside of container 15, with the remaining space filled by a light-weight, plastic filler-type material. In the cut-away portion of FIG. 1, an elevation view of buoy chamber 23c and spring chambers 26b and 26c, a buoy 27c and compression drive springs 29b and c can be seen. Fully loaded, container 15 holds three buoy-drive spring assemblies and each buoy can be launched individually, or three can be launched simultaneously. Each buoy weighs approximately 5 pounds and is forced out of the launch end of container 15 with an exit velocity of about 14 feet per second by a six inch long ⅛ inch coiled spring.

FIG. 2 shows an enlarged, cross-sectional view of the pair of buoy chamber 23c, with buoy 27c therein, and drive spring chamber 26c, with drive spring 29c therein. Buoy 27c is generally in the form of a right circular cylinder and has a narrow, neck portion 31c separating head portion 33c from body portion 35c and thereby providing a shoulder portion 37c. A drive lug 41c, as will be further discussed, that sits inside spring chamber 26c and is connected to spring 29c extends through coinciding and pre-sized apertures 46c and 47c in the walls of chambers 23c and 26c, respectively. Each coiled drive spring 29 is captured between a fixed, upper spring stop 51 and a movable, split ring 53 (stop 51c and ring 53 shown in FIGS. 1 and 2). As buoy 27c is loaded into buoy chamber 23c, a simultaneous rearward movement on ring 53c will force buoy extension tab 42c to expand until tab 42c snaps into the cavity adjacent neck portion 31c. Then, further loading movement causes forces to bear against the expanded coils of spring 29c, compressing it from the position shown in phantom in FIG. 2 to the upper position and thereby storing a sufficient amount of spring energy to launch the buoy. While compression drive spring 29c is being forced up into spring chamber 26c, retainer foot 61c of latch spring 63c is retracted out of the pathway of drive spring 29c. Once the upper section of spring 29c is stopped by upper spring stop 51c, the lower coils of drive spring 29c become further compressed until the bottom surface of ring 53c clears the uppermost surface of foot 61c. Then, latch spring 63c is released and foot 61c now blocks any expansion of spring 29c.

Latch spring 63, also as seen in a cross-sectional view in FIG. 3, is a part of the release means used in the invention. Latch spring 63c, a section of spring wire, is fixedly held at a predetermined place by a fastener 65c on the inside wall of chamber 26c, has foot 61c, a bent portion, at the opposite end, and is held at a midpoint between the two by a piston 71c of a standard linear solenoid 73c. Solenoid 73c is fixed to the inside of chamber 26c by fastener 75c and is electrically connected (not shown) to control module 19. Upon receiving a pulse from the aircraft control center, through control module 19, piston 71c retracts and, through the hooked end 72c catch spring, forces deflection in latch spring 63c. Upon deflection, foot 61c is moved from its blocking position with respect to ring 53c and the stored spring force reacts to move lug 41c and buoy 33c out of container 15. As ring 53c travels within chamber 26c, it encounters sloped surface 28c. This surface acts to cause the base portion 43c of drive lug 41c to move away from buoy chamber 23c, and ring 53c to radially compress, thereby withdrawing tab 42c from neck 31c. By this time, buoy 27c has attained the desired launch velocity and will exit container 15 as planned. At the completion of the launch stroke and to preclude vertical deflection of drive lug 41c, ring 53c expands into notch 54c and is held in a locked position. This keeps the buoy chamber clear for the next consecutive buoy launch.

Figure 6:
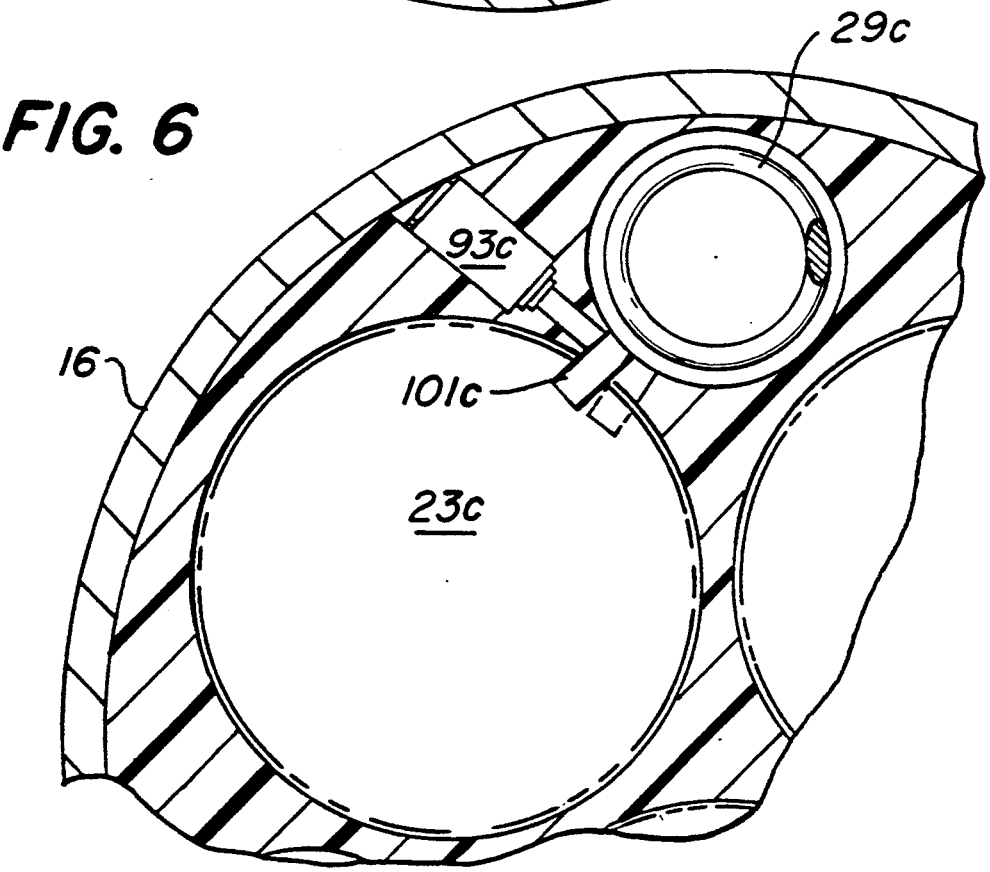
FIG. 6 is a cross-sectional view, similar to FIG. 4, of the alternate release means.
Figure 5:
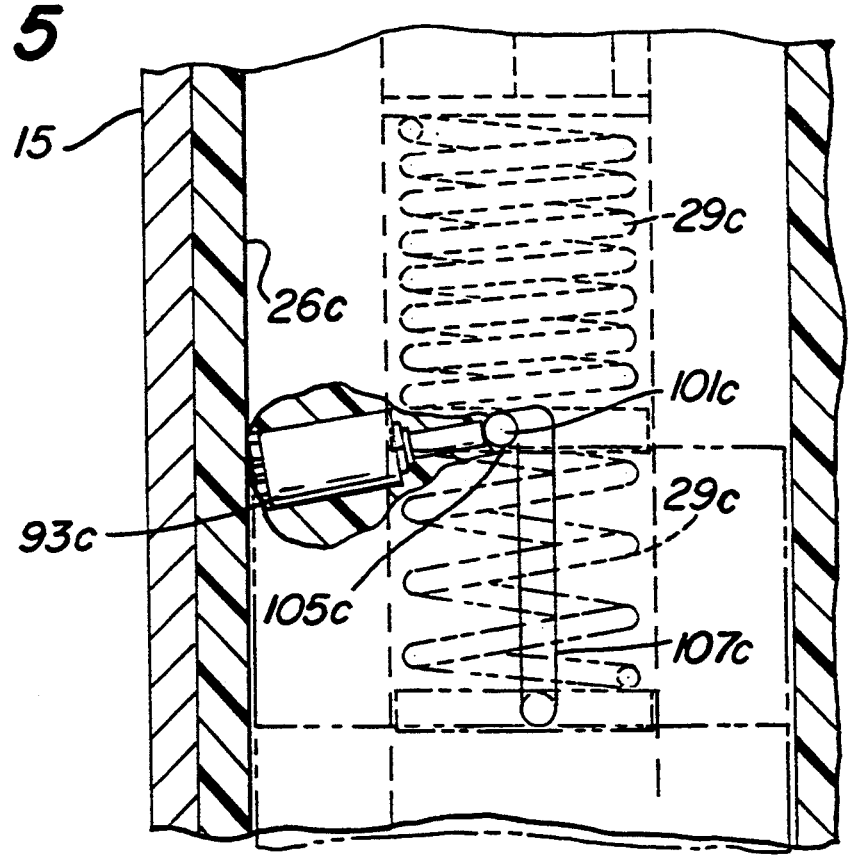
FIG. 5 is a cross-sectional view, similar to FIG. 2, of an alternate embodiment of the release means.
Figure 7:
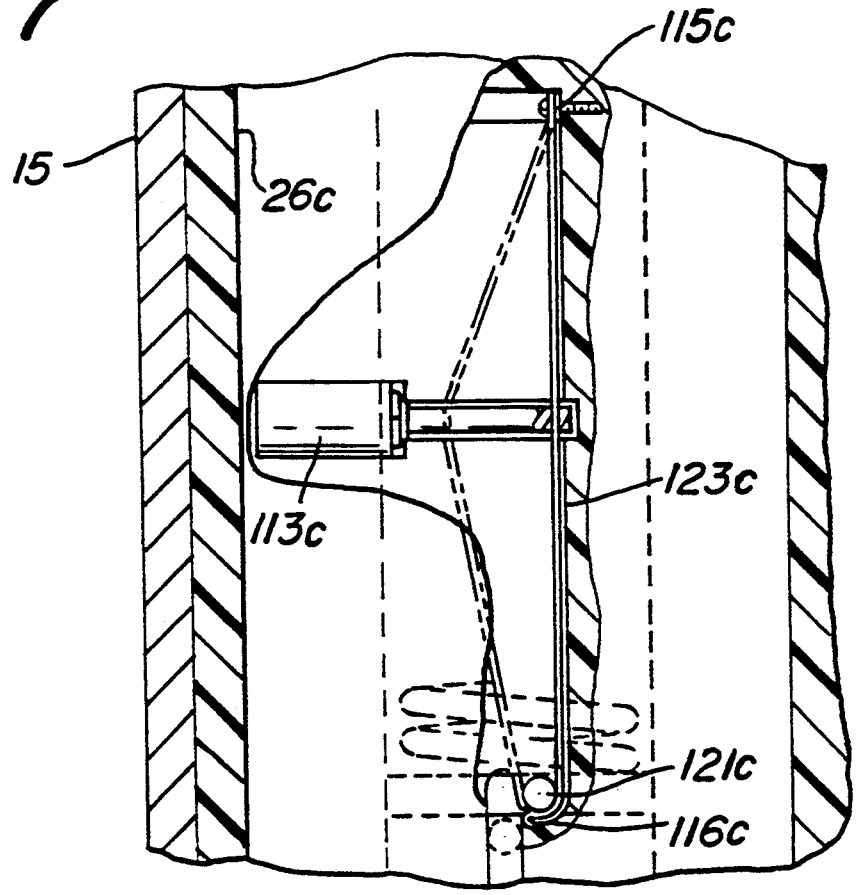
FIG. 7 is an isolated elevation view of the release means showing movement of the latch spring.

Finally, while the simplified, reuseable launcher has been described with reference to a particular embodiment, it should be understood that the embodiment is merely illustrative as there are numerous variations and modifications which may be made by those skilled in the art. As one example of one alternate embodiment, FIG. 5 shows an isolated elevation view of a lug translation firing mechanism in its loaded position. In this embodiment, extendible linear solenoid 93c pushes a lug 101c, connected to spring 29c, over a ledge 105c and down slot 107c to allow spring 29c to expand. As with the preferred embodiment, lug 101c is forced out of buoy chamber 23c. FIG. 6 shows a top view of this embodiment, as taken immediately above solenoid 93c, and illustrating displacement of lug 101c from its locked position to its position just prior to commencement of acceleration down slot 107c. FIG. 7 shows a view, similar to FIG. 5, of a second alternate embodiment where a retracting solenoid 113c pulls lift spring 123c towards the solenoid causing a lug 121c to be rolled free from its seated position. Lift spring 123c is attached by fastener 115c and at a fulcrum 116c.

what I claim is:

1. A mechanically, simplified sonobuoy launcher, comprising:
   a hollow container having a breech end and a discharge end and containing buoy chambers and drive spring chambers;
   a plurality of compression drive springs, each load into an individual spring chamber;
   a plurality of buoys, each loaded into a buoy chamber;
   a plurality of drive means connected one each to said individual springs and to one each of a plurality of buoys;
   a plurality of release means, one each in a movement blocking position with one each of said drive springs and said drive means; and
   a plurality of electric control means, each connected to one each of said release means, to receive an electrical pulse and to move said release means from the drive spring movement blocking position, whereby a buoy is launched.

2. A sonobuoy launcher as described in claim 1 wherein said drive means comprises a substantially elongated "Z"-shaped piece.

3. A sonobuoy launcher as described in claim 2 wherein said release means comprises a substantially straight section of spring wire affixed to said container at one end and having, at the opposite end, a portion bent to form an angle of 90° more or less.

4. A sonobuoy launcher as described in claim 3 wherein said electric control means comprises a solenoid having a hooked plunger pulling against said section of spring wire.

5. A mechanically simplified sonobuoy launcher comprising:
   a tubular container having a breech end and a discharge end;
   at least one compression drive spring chamber therein containing at least one compression drive spring;
   at least one buoy chamber located adjacent to said spring chamber and containing a buoy;
   a drive lug attached to said drive spring and extending through an opening in the common wall between said chambers and releasably connected to said buoy;
   at least one spring wire, fixed at one end to an inner wall, adjacent said drive spring, and having at its opposite end a foot for catching and holding said drive spring when it is in a compressed coiled state; and
   at least one solenoid fixed inside said container and having a hooked plunger contacting said spring wire.

* * * * *